United States Patent
Pham et al.

(10) Patent No.: US 8,183,312 B2
(45) Date of Patent: May 22, 2012

(54) SCRATCH RESISTANT POLYPROPYLENE

(75) Inventors: Hung Pham, West Chester, OH (US); Nikolas Kaprinidis, New York, NY (US); Ralph Dieter Maier, White Plains, NY (US); Johanne Wilson, Dearborn Heights, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/782,172

(22) Filed: May 18, 2010

(65) Prior Publication Data
US 2010/0317779 A1  Dec. 16, 2010

Related U.S. Application Data

(60) Provisional application No. 61/247,682, filed on Oct. 1, 2009, provisional application No. 61/223,500, filed on Jul. 7, 2009, provisional application No. 61/217,059, filed on May 26, 2009.

(51) Int. Cl.
*C08K 5/20* (2006.01)
(52) U.S. Cl. ............................................... 524/232
(58) Field of Classification Search .................... 524/232
See application file for complete search history.

(56) References Cited

U.S. PATENT DOCUMENTS

| | | | |
|---|---|---|---|
| 5,929,145 A * | 7/1999 | Higgins et al. | 524/69 |
| 6,849,330 B1 * | 2/2005 | Morin et al. | 428/364 |
| 7,026,391 B2 | 4/2006 | Scheibelhoffer | |
| 7,390,574 B2 * | 6/2008 | Sharma | 428/500 |
| 2006/0009554 A1 * | 1/2006 | Sharma | 524/230 |
| 2006/0276571 A1 | 12/2006 | Sharma et al. | |

* cited by examiner

*Primary Examiner* — Peter Szekely
(74) *Attorney, Agent, or Firm* — Tyler A. Stevenson

(57) ABSTRACT

Disclosed are scratch resistant polypropylene molded parts comprising a) a polypropylene substrate and incorporated therein a combination of b) an alpha, beta-unsaturated carboxylic reagent functionalized olefin polymer or copolymer, c) a primary or secondary fatty acid amide and d) a nucleating agent selected from the group consisting of sodium benzoate, 2,2'-methylene-bis(4,6-di-tert-butylphenyl)phosphate, zinc glycerolate, calcium salt of 1,2-dicarboxylic acid cyclohexane and sodium salt of 1,2-dicarboxylic acid norbornane. Also disclosed is a method for providing scratch resistance to a polypropylene molded part by incorporating said additives. The polypropylene substrate is for instance polypropylene homopolymer or thermoplastic polyolefin (TPO). Component b) is for instance maleated polypropylene or the reaction product of an alpha-olefin and maleic anhydride. The fatty acid amide is for instance stearyl erucamide or oleyl palmitamide. The molded parts are suitable for automotive parts. The molded parts also advantageously contain a filler, for example talc.

9 Claims, No Drawings

SCRATCH RESISTANT POLYPROPYLENE

This application claims priority of U.S. provisional application Nos. 61/247,682, filed Oct. 1, 2009, 61/223,500, filed Jul. 7, 2009 and 61/217,059, filed May 26, 2009, the contents of which applications are incorporated by reference.

The present invention is aimed at scratch resistant polypropylene compositions. The invention is also aimed at a method of imparting scratch resistance to polypropylene compositions. The polypropylene compositions are for example thermoplastic olefin (TPO) molded parts. The molded parts are useful for example in automotive applications.

U.S. Pat. No. 7,096,191 teaches blends of polyolefin and a reaction product of polyolefin and an alpha, beta unsaturated carboxylic ester, acid or anhydride, such as acrylated or maleated polypropylene.

U.S. 2006/0276571 teaches polyolefin substrates containing a carboxylic acid reagent functionalized olefin polymer and a primary or secondary fatty acid amide.

The U.S. Patents and published applications listed herein are incorporated by reference.

SUMMARY OF THE INVENTION

Disclosed are polypropylene molded parts comprising
a) a polypropylene substrate and incorporated therein a combination of
b) an alpha, beta-unsaturated carboxylic reagent functionalized olefin polymer or copolymer,
c) a primary or secondary fatty acid amide and
d) a nucleating agent selected from the group consisting of sodium benzoate, 2,2'-methylene-bis(4,6-di-tert-butylphenyl)phosphate, zinc glycerolate, calcium salt of 1,2-dicarboxylic acid cyclohexane and sodium salt of 1,2-dicarboxylic acid norbornane.

Also disclosed are polypropylene molded parts comprising
a) a polypropylene substrate and incorporated therein a combination of
b) an alpha, beta-unsaturated carboxylic reagent functionalized olefin polymer or copolymer,
c) a primary or secondary fatty acid amide,
d) a nucleating agent selected from the group consisting of sodium benzoate, 2,2'-methylene-bis(4,6-di-tert-butylphenyl)phosphate, zinc glycerolate, calcium salt of 1,2-dicarboxylic acid cyclohexane and sodium salt of 1,2-dicarboxylic acid norbornane and
e) a filler.

Also disclosed is a method for providing scratch resistance to a polypropylene molded part, which method comprises incorporating into said polypropylene part
b) an alpha, beta-unsaturated carboxylic reagent functionalized olefin polymer or copolymer,
c) a primary or secondary fatty acid amide and
d) a nucleating agent selected from the group consisting of sodium benzoate, 2,2'methylene-bis-(4,6-di-tert-butylphenyl)phosphate, zinc glycerolate, calcium salt of 1,2-dicarboxylic acid cyclohexane and sodium salt of 1,2-dicarboxylic acid norbornane.

Also disclosed is a method for providing scratch resistance to a polypropylene molded part, which method comprises incorporating into said polypropylene part
b) an alpha, beta-unsaturated carboxylic reagent functionalized olefin polymer or copolymer,
c) a primary or secondary fatty acid amide,
d) a nucleating agent selected from the group consisting of sodium benzoate, 2,2'methylene-bis-(4,6-di-tert-butylphenyl)phosphate, zinc glycerolate, calcium salt of 1,2-dicarboxylic acid cyclohexane and sodium salt of 1,2-dicarboxylic acid norbornane and
e) a filler.

DETAILED DISCLOSURE

Present component a) is for instance a polypropylene homopolymer.

Polypropylene homopolymer also covers long chain branched polypropylene.

Polypropylene, can be prepared by different methods. Examples are:

Catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either $\pi$- or $\sigma$-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

According to a further embodiment of the present invention, component a) is a polypropylene random copolymer, alternating or segmented copolymer or block copolymer containing one or more comonomers selected from the group consisting of ethylene, $C_4$-$C_{20}$-$\alpha$-olefin, vinylcyclohexane, vinylcyclohexene, $C_4$-$C_{20}$alkandiene, $C_5$-$C_{12}$cycloalkandiene and norbornene derivatives; the total mole amount of propylene and the comonomer(s) being 100%.

Polypropylene copolymer also covers long chain branched polypropylene copolymer.

Examples of suitable $C_4$-$C_{20}$$\alpha$-olefins are 1-butene, 1-pentene, 1-hexene, 1-heptene, 1-octene, 1-nonene, 1-decene, 1-undecene, 1-dodecene, 1-tetradecene, 1-hexadecene, 1-octadecene, 1-eicosene and 4-methyl-1-pentene.

Examples of suitable $C_4$-$C_{20}$alkandienes are hexadiene and octadiene.

Examples of suitable $C_5$-$C_{12}$cycloalkandienes are cyclopentadiene, cyclohexadiene and cyclooctadiene.

Examples of suitable norbornene derivatives are 5-ethylidene-2-norbornene (ENB), dicyclopentadiene (DCP) and methylene-domethylene-hexahydronaphthaline (MEN).

A propylene/ethylene copolymer contains for example 50 to 99.9%, preferably 80 to 99.9%, in particular 90 to 99.9%, by weight of propylene.

A propylene copolymer wherein the comonomer is a $C_9$-$C_{20}$$\alpha$-olefin such as e.g. 1-nonene, 1-decene, 1-undecene, 1-dodecene, 1-tetradecene, 1-hexadecene, 1-octadecene or 1-eicosene; $C_9$-$C_{20}$alkandiene, $C_9$-$C_{12}$cycloalkandiene or a norbornene derivative such as e.g. 5-ethylidene-2-norbornene (ENB) or methylene-domethylene-hexahydronaphthaline (MEN) contains preferably more than 90 mol %, in particular 90 to 99.9 mol % or 90 to 99 mol %, of propylene.

A propylene copolymer wherein the comonomer is a $C_4$-$C_8$$\alpha$-olefin such as e.g. 1-butene, 1-pentene, 1-hexene, 1-heptene, 1-octene or 4-methyl-1-pentene; vinylcyclohexane, vinylcyclohexene, $C_4$-$C_8$alkandiene or $C_5$-$C_8$cycloalkandiene contains preferably more than 80 mol %, in particular 80 to 99.9 mol % or 80 to 99 mol %, of propylene.

Further examples of component a) are propylene/isobutylene copolymer, propylene/butadiene copolymer, propylene/cycloolefin copolymer, terpolymers of propylene with ethylene and a diene such as hexadiene, dicyclopentadiene or ethylidene-norbornene; propylene/1-olefin copolymers where the 1-olefin is generated in situ; and propylene/carbon monoxide copolymers.

The polypropylenes of the present invention are in particular polypropylene homopolymers, polypropylene impact (heterophasic) copolymers, blends thereof and TPO's such as blends of polypropylene homopolymers and impact modifiers such as EPDM or ethylene/alpha-olefin copolymers.

TPO (thermoplastic olefin) is for example about 10 to about 90 parts propylene homopolymer, copolymer or terpolymer, and about 90 to about 10 parts (by weight) of an elastomeric copolymer of ethylene and a $C_3$-$C_8$ alpha-olefin. The elastomeric copolymer is for instance ethylene/propylene copolymer (EPM) or ethylene/propylene/non-conjugated diene (EPDM). TPO is disclosed for example in U.S. Pat. No. 6,048,942, incorporated by reference.

Component b) is an alpha, beta-unsaturated carboxylic reagent functionalized olefin polymer or copolymer.

The carboxylic reagent functionalized olefin polymers or copolymers are disclosed for instance in U.S. Pat. No. 7,026,391, incorporated herein by reference.

The olefin polymers or copolymers of the functionalized olefin polymers or copolymers are for example the polypropylenes of component a).

The functionalized olefin polymers or copolymers are for example the reaction product of at least one polypropylene and at least one alpha, beta-unsaturated carboxylic reagent, such as a carboxylic acid, ester or anhydride.

In one embodiment, the number average molecular weight of the polypropylenes utilized in this component may range from about 2,000 to about 10,000. These polymers typically have a melt flow from about 8 to about 40, or from about 10 to about 35, or from about 15 to about 30 g/10 min. The amount of carboxylic reagent reacted with the polypropylene may range from about 0.5% to about 30% or from about 1% to about 20%, or from about 2% to about 15%, or from about 4% to about 10% by weight.

The alpha, beta unsaturated carboxylic reagent may be a mono- or dicarboxylic reagent. The carboxylic reagents include carboxylic acids, esters and salts. The monobasic alpha, beta-unsaturated carboxylic reagents include acrylic, methacrylic, annamic, crotonic acids and esters, such as esters having from 1 to about 12 carbon atoms, and salts such as sodium, calcium or magnesium salts. Examples of dicarboxylic reagents include maleic acid, maleic anhydride, fumaric acid, mesaconic acid, himic anhydride, itaconic acid, citraconic acid, itaconic anhydride, citraconic anhydride, monomethyl maleate, monosodium maleate, etc. Particularly preferred alpha, beta-unsaturated carboxylic reagents are acrylic acid, methacrylic acid, acrylic esters, methacrylic esters and maleic anhydride.

The reaction between the carboxylic reagent and the polypropylene polymer or copolymer can be effected by means known to those skilled in the art. For example, the reaction can be conducted in solution by a melt process in the presence of a free radical initiator. The free radical initiators usually are either peroxides or various organic azo compounds. The amount of initiator utilized is generally from about 0.01% to about 5% by weight based on the combined weight of the polyolefin and the carboxylic reagent.

The reaction between the carboxylic reagent and the polypropylene polymer or copolymer is referred to as "grafting". For example, the present functionalized polypropylene polymers or copolymers are polypropylene polymers or copolymers grafted with acrylic acid, methacrylic acid, methyl acrylate, methyl methacrylate, 2-hydroxypropyl methacrylate, butyl acrylate or maleic anhydride. In the case of for example grafting with maleic anhydride, this is termed "maleated".

Examples of acrylated polyolefins are the POLYBOND polymers available from Uniroyal Chemical Company. A particularly useful polymer is POLYBOND 1002, which has a melt flow of 15-25 g/10 min and an acrylic acid content 5.5% to 7.0% by weight. An example of a commercially available maleic acid grafted polypropylene is Epolene E-43 wax from Eastman Chemical Products, Inc. EPOLENE E-43 has an acid number of 47 and an approximate number average molecular weight of 4500. EPOLENE C-16 and C-18 waxes are maleic acid grafted polyethylenes with approximate molecular weights of 8000 and 4000, respectively. Maleated ethylene-propylene elastomers also are useful, and such elastomers are available from Exxon Chemical Company under identification numbers 99-10, 99-14 and 99-26. These copolymers contain 77%, 64% and 43% of ethylene, respectively, and the maleated products contain 0.76%, 0.56% and 0.35% of maleic acid or anhydride, respectively.

Other examples of commercially available maleic acid anhydride grafted polyolefins include KRATON FG1901X from Shell which is often referred to as a maleated selectively hydrogenated SEBS copolymer; terpolymers available from CdF Chimie under designations such as LOTADER 3200 (prepared from a mixture of 88% by weight ethylene, 9% by weight butyl acrylate and 3% maleic anhydride), LOTADER 6600 (70% ethylene, 27% acrylic ester and 3% maleic anhydride) etc.; ethylene vinyl acetate copolymers grafted with maleic anhydride (EVA-MAH) are available from Quantum Chemical Corp.

Alternatively, the functionalized olefin polymers or copolymers of component b) are the reaction products of an alpha-olefin with an alpha, beta-unsaturated carboxylic reagent as described above. The reaction is effected by means known in the art. For example, the reaction can be conducted by a melt process in the presence of a free radical initiator. The radical initiators are for example peroxides or organic azo compounds. Again, the unsaturated carboxylic reagents are for example acrylic acid, methacrylic acid, acrylic esters, methacrylic esters or maleic anhydride.

For instance, the alpha-olefin is from $C_3$ up to about $C_{33}$, for example the alpha-olefin is a $C_{18}$-$C_{26}$ alpha-olefin, for example a $C_{22-26}$ or a $C_{18}$ alpha-olefin.

For instance, the functionalized olefin is a maleated alpha-olefin, that is, the reaction product of an alpha-olefin and maleic anhydride. For example the maleated alpha-olefin is of the formula

where
R is $C_{16}$ to $C_{24}$ alkyl and
n is an integer such that the average molecular weight is from about 20,000 to about 50,000.

The primary or secondary fatty acid amides are for example where the fatty group of the fatty acids are $C_{11}$ to $C_{21}$ alkyl or alkenyl.

The primary or secondary fatty acid amide is for example at least one compound selected from the group consisting of oleamide, erucamide, stearamide, behenamide, oleyl palmitamide, stearyl erucamide, ethylene-bis-stearamide and ethylene-bis-oleamide.

In particular, the present fatty acid amides are secondary fatty acid amides, for example stearyl erucamide or oleyl palmitamide.

Suitable fatty acid amides are for example disclosed in U.S. Pat. No. 6,228,915, the relevant disclosures of which are hereby incorporated by reference.

Alkyl is straight or branched chain and is for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl or docosyl.

Alkenyl is ethylenically unsaturated alkyl, for example allyl.

The weight:weight ratio of the functionalized olefin polymer or copolymer additive to the primary or secondary fatty acid amide additive is for example from about 20:1 to about 1:20, from about 10:1 to about 1:10, from about 1:1 to about 20:1, for example from about 1:1 to about 15:1, from about 1:1 to about 10:1, from about 1:1 to about 7:1, or from about 1:1 to about 5:1. For instance, the weight:weight ratio of the functionalized olefin to the primary or secondary fatty acid amide is about 1.5:1, about 2:1, about 3:1, or about 4:1.

The total of the functionalized olefin polymer or copolymer b) and primary or secondary fatty acid amide additive c) combination to be incorporated into the polypropylene substrate is for example from about 1% to about 15% by weight, based on the weight of the polypropylene substrate. For example, the additive combination is present from about 1% to about 10%, from about 3% to about 7%, or from about 3% to about 5% by weight, based on the weight of the polypropylene substrate. For instance, the present combination of b) and c) is present from about 1% to about 3%, from about 1% to about 5%, or from about 1% to about 7% by weight, based on the weight of the polypropylene substrate.

Component d), the present nucleating agents, are selected from sodium benzoate, 2,2'-methylene-bis(4,6-di-tert-butylphenyl)phosphate and zinc glycerolate.

It is contemplated that other known nucleating agents would also perform well in the present formulations. Such further nucleating agents are disclosed for example in U.S. Pat. Nos. 6,465,551 and 6,878,443, incorporated herein by reference. Further possible nucleating agents are for instance dibenzylidene sorbitol compounds, for example a monomethyldibenzylidene sorbitol such as 1,3:2,4-bis(p-methylbenzylidene) sorbitol or a dimethylbenzylidene sorbitol such as 1,3:2,4-bis(3,4-dimethylbenzylidene) sorbitol. Other known nucleating agents are [2.2.1]heptane-bicyclodicarboxylic acid (1,2-dicarboxylic acid norbornane) and 1,2-dicarboxylic acid cyclohexane. Other metal salts of organic acids in addition to sodium benzoate may also be suitable, for instance metal salts of 1,2-dicarboxylic acid cyclohexane and 1,2-dicarboxylic acid norbornane, for instance sodium or calcium salts. Other cyclic bis-phenol phosphates may also be suitable.

The present nucleating agents are employed for instance at a level of from about 1 ppm to about 50,000 ppm by weight, based on the weight of the polypropylene. For instance, the present nucleating agents are employed at a level of from about 10 ppm to about 20,000 ppm, from about 100 ppm to about 10,000 ppm or from about 1000 ppm to about 5000 ppm by weight, based on the weight of the polypropylene.

The additives of the invention may be added to the polypropylene substrate individually or mixed with one another. If desired, the individual components can be mixed with one another before incorporation into the polypropylene for example by dry blending, compaction or in the melt.

The incorporation of the additives of the invention is carried out by known methods such as dry blending in the form of a powder, or wet mixing in the form of solutions, dispersions or suspensions for example in an inert solvent, water or oil. The additives of the invention may be incorporated, for example, before or after molding or also by applying the dissolved or dispersed additive or additive mixture to the polypropylene material, with or without subsequent evaporation of the solvent or the suspension/dispersion agent. They may be added directly into the processing apparatus (e.g. extruders, internal mixers, etc.), e.g. as a dry mixture or powder or as a solution or dispersion or suspension or melt.

The incorporation can be carried out in any heatable container equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

The addition of the additives to the polypropylene substrate can be carried out in all customary mixing machines in which the polypropylene is melted and mixed with the additives. Suitable machines are known to those skilled in the art. They are predominantly mixers, kneaders and extruders.

Processing includes extrusion, co-kneading, pultrusion, compression molding, sheet extrusion, thermoforming, injection molding or rotational molding. The process is preferably carried out in an extruder by introducing the additives during melt processing.

Particularly preferred processing machines are single-screw extruders, contrarotating and corotating twin-screw extruders, rotomolding devices, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion, Vol.* 1 Grundlagen, Editors F. Hensen, W. Knappe, H. Potente, 1989, pp. 3-7, ISBN:3-446-14339-4 (Vol. 2 *Extrusionsanlagen* 1986, ISBN 3-446-14329-7).

For example, the screw length 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components are added, these can be premixed or added individually.

The additives of the invention can also be sprayed onto the polypropylene substrate. They are able to dilute other additives (for example optional conventional additives) or their melts so that they can be sprayed also together with these additives onto the substrate. Addition by spraying during the deactivation of the polymerization catalysts is particularly advantageous; in this case, the steam evolved may be used for deactivation of the catalyst. In the case of spherically polymerized polypropylenes it may, for example, be advantageous to apply the additives of the invention, optionally together with other additives, by spraying.

The additives of the invention and optional further additives can also be added to the polypropylene in the form of a masterbatch ("concentrate") which contains the components in a concentration of, for example, about 1% to about 40% and preferably about 2% to about 20% by weight incorporated in a polymer. The polymer must not necessarily be identical to the polypropylene where the additives are added finally. In such operations, the polymer can be used in the form of powder, granules, solutions, suspensions or in the form of latices.

Incorporation can take place prior to or during the shaping operation, or by applying the dissolved or dispersed compound to the polypropylene, with or without subsequent evaporation of the solvent. A further possibility for incorporating the additives of the invention into polypropylene substrates is to add them before, during or directly after the polymerization of the corresponding monomers or prior to crosslinking. In this context the additives of the invention can be added as is or else in encapsulated form (for example in waxes, oils or polymers).

The polypropylenes containing the additives of the invention described herein can be used for the production of moldings, rotomolded articles, injection molded articles, blow molded articles, profiles, and the like.

The polypropylenes of the present invention may optionally also contain from about 0.01 to about 5%, preferably from about 0.025 to about 2%, and especially from about 0.1 to about 1% by weight of various conventional additives, such as the materials listed below, or mixtures thereof.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl) phenol, 2,4-dimethyl-6-(1-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2, 2'-methylenebis (6-tert-butyl-4-methylphenol), 2,2'-methylenebis(6-tert-butyl-4-ethylphenol), 2,2'-methylenebis[4-methyl-6-α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-α-methylbenzyl)-4-nonylphenol], 2,2'-methylenebis[6-(αα-dimethylbenzyl)-4-nonylphenol], 4,4'-methylenebis(2, 6-di-tert-butylphenol), 4,4'-methylenebis(6-tert-butyl-2-methylphenol), 1,1-bis(5-tert-butyl-4-hydroxy-2-methylphenyl) butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl) butyrate], bis(3-tert-butyl-4-hydroxy-5-methyl-phenyl)dicyclopentadiene, bis[2-(3'tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1, 5,5-tetra-(5-tert-butyl-4-hydroxy-2-methylphenyl)pentane.

1.7. Benzyl compounds, for example 3, 5,3',5'-tetra-tert-butyl-4,4'-dihydroxydibenzyl ether, octadecyl-4-hydroxy-3, 5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl) sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl) isocyanurate, 1,3,5-tris-(4-tert-butyl-3-hydroxy-2,6-dimethylbenzyl) isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, calcium-salt.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1, 3,5-tris-(3,5-di-tert-butyl-4-hydroxybenzyl)-2,4,6-trimethylbenzene, 1,4-bis(3,5-di-tert-butyl-4-hydroxybenzyl)-2,3, 5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxy-benzyl)isocyanurate, 1,3,5-tris(4-tert-butyl-3-hydroxy-2,6-dimethylbenzy)isocyanurate, 2,4, 6-tris(3,5-di-tert-butyl-4-hydroxyphenylethyl)-1,3,5- triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate.

1.13. Esters of β(3-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexane-dial, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hy-droxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis (4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1,3'-dimethylbutyl)phenyl]amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol.

2. UV Absorbers and Light Stabilizers 2.1. 2-(2-Hydroxyphenyl)-2H-benzotriazoles, for example known commercial hydroxyphenyl-2H-benzotriazoles and benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl) phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2- methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumyl-phenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-αcumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates and malonates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, Sanduvor® PR25, dimethyl p-methoxybenzylidenemalonate (CAS# 7443-25-6), and Sanduvor® PR31, di-(1,2,2,6,6-pentamethylpiperidin-4-yl) p-methoxybenzylidenemalonate (CAS #147783-69-5).

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amine stabilizers, for example 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylyamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)-hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-amino-propylamino) ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethyl-4-piperidyloxycarbonyl)-2-(4-methoxyphenyl) ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

The sterically hindered amine may also be one of the compounds described in U.S. Pat. No. 5,980,783, the relevant parts of which are hereby incorporated by reference, that is compounds of component I-a), I-b), I-c), I-d), I-e), I-f), I-g), I-h), I-i), I-j), I-k) or I-l), in particular the light stabilizer 1-a-1, 1-a-2, 1-b-1, 1-c-1, 1-c-2, 1-d-1, 1-d-2, 1-d-3, 1-e-1, 1-f-1, 1-g-1, 1-g-2 or 1-k-1 listed on columns 64-72 of said U.S. Pat. No. 5,980,783.

The sterically hindered amine may also be one of the compounds described in U.S. Pat. Nos. 6,046,304 and 6,297,299, the disclosures of which are hereby incorporated by reference, for example compounds as described in claim 10 or 38 or in Examples 1-12 or D-1 to D-5 therein.

2.7. Sterically hindered amines substituted on the N-atom by a hydroxy-substituted alkoxy group, for example compounds such as 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, the reaction product of 1-oxyl-4- hydroxy-2,2,6,6-tetramethylpiperidine with a carbon radical from t-amylalcohol, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl) sebacate, bis(1-(2-hydroxy-2-methylpropoxy)-2,2,6,6-tetramethylpiperidin-4-yl) adipate, bis(1-(2-hydroxy-2-methylpropoxy)-2,2,6,6-tetramethylpiperidin-4-yl) succinate, bis(1-(2-hydroxy-2-methylpropoxy)-2,2,6,6-tetramethylpiperidin-4-yl) glutarate and 2,4-bis{N-[1-(2-hydroxy-2-methylpropoxy)-2,2,6,6-tetramethylpiperidin-4-yl]-N-butylamino}-6-(2-hydroxyethyl-amino)-s-triazine.

2.8. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.9. Tris-aryl-o-hydroxyphenyl-s-triazines, for example known commercial tris-aryl-o-hydroxyphenyl-s-triazines and triazines as disclosed in, U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,736,597; 5,942,626; 5,959,008; 5,998,116; 6,013,704; 6,060,543; 6,242,598 and 6,255,483, for example 4,6-bis-(2,4-dimethylphenyl)-2-(2-hydroxy-4-octyloxyphenyl)-s-triazine, Cyasorb® 1164, Cytec Corp, 4,6-bis-(2,4-dimethylphenyl)-2-(2, 4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxy-propyloxy)phenyl]-6-[2-hydroxy-4-(3-sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy)phenynl]-s-triazine, 2,4-bis(2-hydroxy-4-n-butyloxyphenyl)-6-(2,4-di-n-butyloxyphenyl)-s-triazine, 2,4-bis(2,4-dimethyl-phenyl)-6-[2-hydroxy-4-(3-nonyloxy*-2-hydroxypropyloxy)-5-α-cumylphenyl]-s-triazine (*denotes a mixture of octyloxy, nonyloxy and decyloxy groups), methylenebis-{2,4-bis(2,4-dimethyl-phenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylisopropylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyldihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris (2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-dibenzo[d,f][1,3,2]dioxaphosphepin, 6-fluoro-2,4,8,10-tetra-tert-butyl-12-methyl-dibenzo[d,g][1,3,2]dioxaphosphocin, bis(2,4-di-tert-butyl-6-methylphenyl)methyl phosphite, bis(2,4-di-tert-butyl-6-methylphenyl)ethyl phosphite, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite.

Especially preferred are the following phosphites:

Tris(2,4-di-tert-butylphenyl) phosphite (Irgafos® 168, Ciba Specialty Chemicals Corp.), tris(nonylphenyl) phosphite,

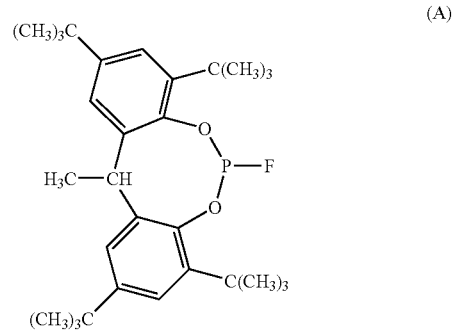

(A)

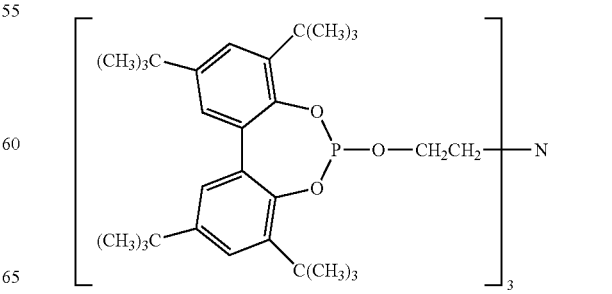

(B)

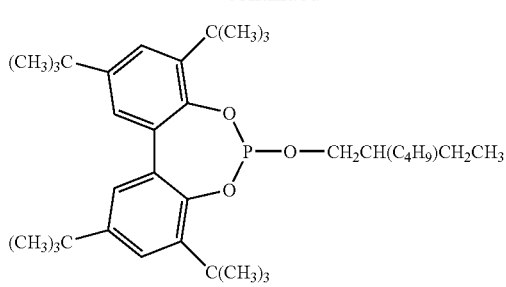
(C)

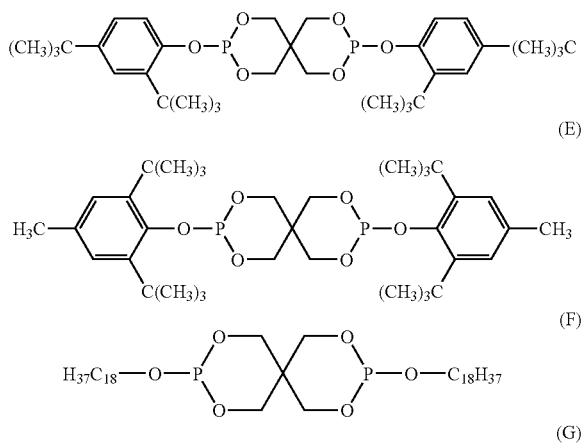
(D)
(E)

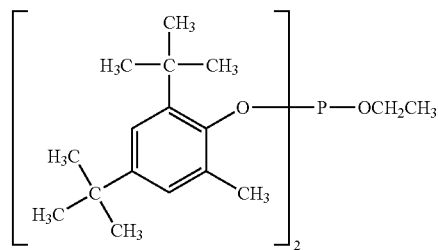
(F)
(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxyl-amine, N-heptadecyl-N-octadecylhydroxylamine, N-methyl-N-octadecylhydroxylamine and the N,N-dialkylhydroxylamine derived from hydrogenated tallow amine.

6. Nitrones, for example N-benzyl-α-phenylnitrone, N-ethyl-α-methylnitrone, N-octyl-α-heptylnitrone, N-lauryl-α-undecylnitrone, N-tetradecyl-α-tridcylnitrone, N-hexadecyl-α-pentadecylnitrone, N-octadecyl-α-heptadecylnitrone, N-hexadecyl-α-heptadecylnitrone, N-ocatadecyl-α-pentadecylnitrone, N-heptadecyl-α-heptadecylnitrone, N-octadecyl-α-hexadecylnitrone, N-methyl-α-heptadecylnitrone and the nitrone derived from N,N-dialkylhydro-xylamine derived from hydrogenated tallow amine.

7. Amine oxides, for example amine oxide derivatives as disclosed in U.S. Pat. Nos. 5,844,029 and 5,880,191, didecyl methyl amine oxide, tridecyl amine oxide, tridodecyl amine oxide and trihexadecyl amine oxide.

8. Benzofuranones and indolinones, for example those disclosed in U.S. Pat. No. 4,325,863, 4,338,244, 5,175,312, 5,216,052, 5,252,643 5,369,159 5,356,966 5,367,008 5,428, 177 or 5,428,162 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5, 7-di-tert-butyl-benzofuran-2-one, 3-(3,4-dimethylphenyl)-5, 7-di-tert-butyl-benzofuran-2-one, Irganox® HP-136, Ciba Specialty Chemicals Corp., and 3-(2,3-dimethylphenyl)-5,7-di-tert-butyl-benzofuran-2-one.

9. Thiosynergists, for example dilauryl thiodipropionate or distearyl thiodipropionate.

10. Peroxide scavengers, for example esters of β-thiodipropionic acid, for example the lauryl, stearyl, myristyl or tridecyl esters, mercaptobenzimidazole or the zinc salt of 2-mercapto-benzimidazole, zinc dibutyldithiocarbamate, dioctadecyl disulfide, pentaerythritol tetrakis(β-dodecylmercapto)propionate.

11. Polyamide stabilizers, for example copper salts in combination with iodides and/or phosphorus compounds and salts of divalent manganese.

12. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

13. Other nucleating agents, for example inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate; polymeric compounds such as ionic copolymers (ionomers).

14. Fillers and reinforcing agents, for example calcium carbonate, silicates, glass fibers, glass bulbs, asbestos, talc, kaolin, mica, barium sulfate, metal oxides and hydroxides, carbon black, graphite, wood flour and flours or fibers of other natural products, synthetic fibers.

The present formulations advantageously comprise a filler, for example coated or uncoated talc.

The fillers may also be for example natural or synthetic phyllosilicates or a mixture of such phyllosilicates. Fillers of special interest are for example layered silicate clays. Of very special interest are montmorillonite, bentonite, beidelite, mica, hectorite, saponite, nontronite, sauconite, vermiculite, ledikite, magadite, kenyaite, stevensite, volkonskoite, hydrotalcite, illite, kaolinite, wollastonite, attapulgite, talc or silica or a mixture thereof.

The filler is present from about 1% to about 50% by weight, based on the weight of the polypropylene. For instance, the filler is present at about 5%, about 10%, about 15%, about 20% or about 25% and within all of these possible ranges, based on the weight of the polypropylene.

15. Dispersing Agents, such as polyethylene oxide waxes or mineral oil.

16. Other additives, for example plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, clarifiers such as substituted and unsubstituted bisbenzylidene sorbitols, benzoxazinone UV absorbers such as 2,2'-p-phenylene-bis(3,1-benzoxazin-4-one), Cyasorb® 3638 (CAS# 18600-59-4), and blowing agents.

The present polypropylene compositions exhibit good weatherability (stability towards heat, oxygen and light), scratch resistance, good processability, good mechanical strength, good gloss retention, and are non-sticky. The polypropylene molded parts are suitable for example for automotive applications, i.e. bumper fascia and the like.

EXAMPLES

The following Examples illustrate the present invention. The Examples are not meant to limit the scope of the present invention. Unless otherwise indicated, all percentages are in parts by weight.

Example 1

Thermoplastic Olefin (TPO)

Test formulations are prepared in unfilled TPO via melt compounding. The TPO is polypropylene containing about 8-10% by weight elastomer with 2% by weight carbon black. The TPO and the additives are mixed at 204° C. to 230° C. in an 18 mm twin screw extruder. The pellets are dried overnight at 80° C. The TPO formulations are injection molded at a temperature of 450° F., injection and holding pressures at 1000 psi, back pressure of 50 psi, screw speed 150 rpm, clamping unit setting at 287.5 mm, shot size 70 and chiller temperature of 45° F. to provide 4 inch by 6 inch smooth, flat plaques.

The plaques are tested according to the five finger scratch test.

Standard Five Finger Scratch test guidelines (Daimler Chrysler Corporation Test Number LP-463DD-18-1, dated 2002-07-24).

| Rating | Scratch Width | Whitening |
| --- | --- | --- |
| 1 (best) | <0.2 mm wide, almost invisible | none |
| 2 | 0.2-0.3 mm wide, slight deformation, visible at close range | none |
| 3 | 0.3-0.4 mm wide, clearly visible | |
| 4 | 0.4-0.5 mm wide | visible whitening over entire scratch |
| 5 (worst) | >0.5 mm wide | white over entire scratch and possibly accompanied by debris |

The scratch test is performed at 10 Newtons at 0 min. (right off the mold), 5 min., 10 min., 20 min. and overnight (24 hours). The samples are stored at ambient conditions.

The following formulations (weight percent) are prepared:

| Formulation | TPO | anti-scratch additive | NU1 | NU2 | NU3 |
| --- | --- | --- | --- | --- | --- |
| 1 | 100 | — | — | — | — |
| 2 | 97 | 3 | — | — | — |
| 3 | 96.85 | 3 | 0.15 | — | — |
| 4 | 96.7 | 3 | 0.3 | — | — |
| 5 | 96.85 | 3 | — | 0.15 | — |
| 6 | 96.7 | 3 | — | 0.3 | — |
| 7 | 96.85 | 3 | — | — | 0.15 |
| 8 | 96.7 | 3 | — | — | 0.3 |

The results for scratch resistance at 10 Newtons is as follows:

| Formulation | rating at time 0 | rating at 24 hours |
| --- | --- | --- |
| 1 | 5 | 5 |
| 2 | 4 | 2 |
| 3 | 1-2 | 1-2 |
| 4 | 1-2 | 1-2 |
| 5 | 1-2 | 1-2 |
| 6 | 1-2 | 1-2 |
| 7 | 1-2 | 1-2 |
| 8 | 1-2 | 1-2 |

Formulation 1 shows no scratch resistance at 10 N.

Formulation 2, with no nucleating agent showed poor scratch performance at time 0. A certain level of scratch resistance is achieved upon storing 24 hours.

In Formulations 3-8, containing both anti-scratch additive and nucleating agent, good scratch resistance is achieved at time 0, right off the mold. This scratch resistance is better than that of Formulation 2 after 24 hours. The same good scratch performance is observed after storing 24 hours. That is, scratch resistance is achieved with the compositions of the present invention without conditioning, without storing or curing at room temperature or elevated temperatures.

The anti-scratch additive is a 2:1 weight blend of maleated polypropylene to stearyl erucamide.

NU1 is sodium benzoate. NU2 is 2,2'-methylene-bis(4,6-di-tert-butylphenyl)phosphate. NU3 is zinc glycerolate.

Example 2

Filled Thermoplastic Olefin (TPO)

Test formulations are prepared in TPO via melt compounding. The TPO is polypropylene containing about 8-10% by weight elastomer with 2% by weight carbon black. The TPO and the additives are mixed at 204° C. to 230° C. in an 18 mm twin screw extruder. Also added is 30% by weight uncoated talc filler, based on the weight of the TPO. The pellets are dried overnight at 80° C. The TPO formulations are injection molded at a temperature of 450° F., injection and holding pressures at 1000 psi, back pressure of 50 psi, screw speed 150 rpm, clamping unit setting at 287.5 mm, shot size 70 and chiller temperature of 45° F. to provide 4 inch by 6 inch smooth, flat plaques.

The plaques are tested according to the five finger scratch test after storing for 24 hours.

| Formulation | TPO | anti-scratch additive | NU1 | NU2 |
| --- | --- | --- | --- | --- |
| 9 | 100 | — | — | — |
| 10 | 98.5 | 1.5 | — | — |
| 11 | 97.0 | 3.0 | — | — |
| 12 | 98.35 | 1.5 | — | 0.15 |
| 13 | 98.35 | 1.5 | 0.15 | — |
| 14 | 99.85 | — | — | 0.15 |
| 15 | 99.85 | — | 0.15 | — |

The results for scratch resistance at 20, 15 and 10 Newtons are as follows:

| Formulation | 20 N | 15 N | 10 N |
| --- | --- | --- | --- |
| 9 | 5 | 5 | 4 |
| 10 | 5 | 4 | 2-3 |

-continued

| Formulation | 20 N | 15 N | 10 N |
|---|---|---|---|
| 11 | 5 | 2-3 | 1-2 |
| 12 | 4-5 | 1 | 1 |
| 13 | 4-5 | 1 | 1 |
| 14 | 5 | 5 | 3-4 |
| 15 | 5 | 5 | 3-4 |

The anti-scratch additive is as in Example 1.

Formulations 12 and 13 are of the present invention and show substantially reduced whitening according to the 5 finger scratch test.

Formulations 12 and 13 exhibit synergistic results compared to formulations 10, 14 and 15.

What is claimed is:

1. A thermoplastic olefin molded part comprising
a) a thermoplastic olefin substrate and
incorporated therein a combination of
b) maleated polypropylene,
c) stearyl erucamide and
d) a nucleating agent selected from the group consisting of sodium benzoate, 2,2'-methylene-bis(4,6-di-tert-butylphenyl)phosphate and zinc glycerolate,
where the nucleating agent is present from 0.15 to 0.3 weight percent and components b) and c) together are present from 1.5 to 3.0 weight percent, the weight percents being based on the total weight of components a), b), c) and d).

2. A molded part according to claim 1 where the weight:weight ratio of the maleated polypropylene to the stearyl erucamide is from about 1:1 to about 20:1.

3. A molded part according to claim 2 where the weight:weight ratio is from about 1:1 to about 5:1.

4. A molded part according to claim 1 where the nucleating agent is sodium benzoate.

5. A molded part according to claim 1 where the nucleating agent is 2,2'-methylene-bis(4,6-di-tert-butylphenyl)phosphate.

6. A method for providing scratch resistance to a thermoplastic olefin molded part, which method comprises incorporating into a) a thermoplastic olefin substrate
b) maleated polypropylene,
c) stearyl erucamide and
d) a nucleating agent selected from the group consisting of sodium benzoate, 2,2'methylene-bis-(4,6-di-tert-butylphenyl)phosphate and zinc glycerolate,
where the nucleating agent is present from 0.15 to 0.3 weight percent and components b) and c) together are present from 1.5 to 3.0 weight percent, the weight percents being based on the total weight of components a), b), c) and d).

7. A molded part according to claim 1 further comprising e) a filler.

8. A method according to claim 6 further comprising the incorporation of e) a filler.

9. A molded part according to claim 1 where the nucleating agent is zinc glycerolate.

* * * * *